US010273816B2

(12) United States Patent
Abraham et al.

(10) Patent No.: US 10,273,816 B2
(45) Date of Patent: Apr. 30, 2019

(54) WEAR PAD TO PREVENT CRACKING OF FAN BLADE

(71) Applicant: United Technologies Corporation, Hartford, CT (US)

(72) Inventors: Jay T. Abraham, South Glastonbury, CT (US); Ethan C. Drew, Mansfield, CT (US); Scott C. Billings, Marlborough, CT (US); Michael A. Weisse, Tolland, CT (US); James O. Hansen, Glastonbury, CT (US); Venkatarama K. Seetharaman, Rocky Hill, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 599 days.

(21) Appl. No.: 14/170,985

(22) Filed: Feb. 3, 2014

(65) Prior Publication Data

US 2015/0110636 A1    Apr. 23, 2015

Related U.S. Application Data

(60) Provisional application No. 61/763,702, filed on Feb. 12, 2013.

(51) Int. Cl.
*F01D 5/30* (2006.01)

(52) U.S. Cl.
CPC ........ *F01D 5/3092* (2013.01); *F05D 2220/36* (2013.01); *F05D 2300/614* (2013.01); *F05D 2300/701* (2013.01); *Y02T 50/671* (2013.01)

(58) Field of Classification Search
CPC ...... F01D 5/3092; F01D 5/288; F01D 5/3007; F01D 5/3015; F05D 2300/603; F05D 2300/611; F05D 2220/36; F05D 2300/614
See application file for complete search history.

(56) References Cited

U.S. PATENT DOCUMENTS

| | | | |
|---|---|---|---|
| 4,802,824 A * | 2/1989 | Gastebois | F01D 5/282 416/193 A |
| 5,197,857 A | 3/1993 | Glynn et al. | |
| 5,275,536 A * | 1/1994 | Stephens | F01D 5/26 416/193 A |
| 5,735,044 A | 4/1998 | Ferrigno et al. | |
| 5,846,057 A | 12/1998 | Ferrigno et al. | |
| 6,270,318 B1 | 8/2001 | Shah et al. | |
| 6,435,826 B1 | 8/2002 | Allen et al. | |
| 6,435,830 B1 | 8/2002 | Allen et al. | |
| 6,435,835 B1 | 8/2002 | Allen et al. | |
| 6,761,536 B1 | 7/2004 | Bash et al. | |
| 7,229,253 B2 * | 6/2007 | Broderick | B23P 6/002 416/225 |
| 7,938,626 B2 | 5/2011 | Forgue et al. | |
| 8,057,163 B2 * | 11/2011 | Thompson, Jr. | 415/115 |
| 2001/0004474 A1 | 6/2001 | Allen et al. | |
| 2001/0004475 A1 | 6/2001 | Allen et al. | |
| 2002/0119043 A1 | 8/2002 | Allen et al. | |
| 2002/0130047 A1 | 9/2002 | Allen et al. | |

(Continued)

*Primary Examiner* — Christopher J Besler
(74) *Attorney, Agent, or Firm* — Carlson, Gaskey & Olds, P.C.

(57) ABSTRACT

A fan blade of a gas turbine engine includes an airfoil, a root received in a slot of a hub, and a wear pad covering at least a portion of the root and made of an integrally bonded woven composite laminate.

12 Claims, 2 Drawing Sheets

(56) References Cited

U.S. PATENT DOCUMENTS

| | | | |
|---|---|---|---|
| 2006/0277753 A1* | 12/2006 | Ntsama-Etoundi | B23P 6/005 29/889.1 |
| 2007/0048142 A1* | 3/2007 | Dambrine | F01D 5/288 416/219 R |
| 2009/0016890 A1* | 1/2009 | Douguet | F01D 5/3007 416/219 R |
| 2009/0165519 A1* | 7/2009 | Berndt | B24C 1/04 72/53 |
| 2010/0008782 A1* | 1/2010 | Danescu | F01D 5/3007 416/219 R |
| 2010/0068062 A1* | 3/2010 | DiMascio | F01D 5/3007 416/219 R |
| 2011/0211965 A1* | 9/2011 | Deal | F01D 5/147 416/223 R |
| 2013/0302173 A1* | 11/2013 | Booze | F01D 5/282 416/230 |
| 2014/0154073 A1* | 6/2014 | Cairo | F01D 5/282 416/1 |

\* cited by examiner

WEAR PAD TO PREVENT CRACKING OF FAN BLADE

CROSS-REFERENCE TO RELATED APPLICATION

This application claims priority to U.S. Provisional Application 61/763,702 filed Feb. 12, 2013.

BACKGROUND OF THE INVENTION

A gas turbine engine includes a fan including a plurality of fan blades. Each fan blade includes an airfoil, a root received in a slot of a hub, and a platform located between the airfoil and the root. A crack or fracture in the root can be more difficult to repair than a crack in the airfoil.

SUMMARY OF THE INVENTION

A fan blade of a gas turbine engine according to an exemplary embodiment of this disclosure, among other possible things, includes an airfoil, a root received in a slot of a hub, and a wear pad covering at least a portion of the root and made of an integrally bonded woven composite laminate.

In a further embodiment of the foregoing fan blade, the fan blade is made of aluminum alloy.

In a further embodiment of any of the foregoing fan blades, the airfoil includes a plurality of channels, and a cover is located over the plurality of channels.

In a further embodiment of any of the foregoing fan blades, the root is substantially solid.

In a further embodiment of any of the foregoing fan blades, a corrosion inhibiting primer coating coats the fan blade.

In a further embodiment of any of the foregoing fan blades, the wear pad is made of polytetrafluoroethylene fibers and aramid polymer fibers.

In a further embodiment of any of the foregoing fan blades, the wear pad is bonded to the root of the fan blade with an adhesive.

In a further embodiment of any of the foregoing fan blades, the root of the fan blade has a burnishing depth of about 0.040 inch.

A fan of a gas turbine engine according to an exemplary embodiment of this disclosure, among other possible things includes a hub including a plurality of slots, and a plurality of fan blades. Each of the plurality of fan blades includes an airfoil and a root. The root of each of the plurality of fan blades is received in one of the plurality of slots of the hub. A wear pad is made of an integrally bonded woven composite laminate covers at least a portion of the root.

In a further embodiment of the foregoing fan, the fan blade is made of aluminum alloy.

In a further embodiment of any of the foregoing fans, the airfoil includes a plurality of channels, and a cover is located over the plurality of channels.

In a further embodiment of any of the foregoing fans, the root is substantially solid.

In a further embodiment of any of the foregoing fans, a corrosion inhibiting primer coating coats the fan blade.

In a further embodiment of any of the foregoing fans, the wear pad is made of polytetrafluoroethylene fibers and aramid polymer fibers.

In a further embodiment of any of the foregoing fans, the wear pad is bonded to the root of the fan blade with an adhesive.

In a further embodiment of any of the foregoing fans, the root has a burnishing depth of about 0.040 inch.

These and other features of the present invention can be best understood from the following specification and drawings, the following of which is a brief description.

DETAILED DESCRIPTION OF THE PREFERRED EMBODIMENTS

Figure 1:
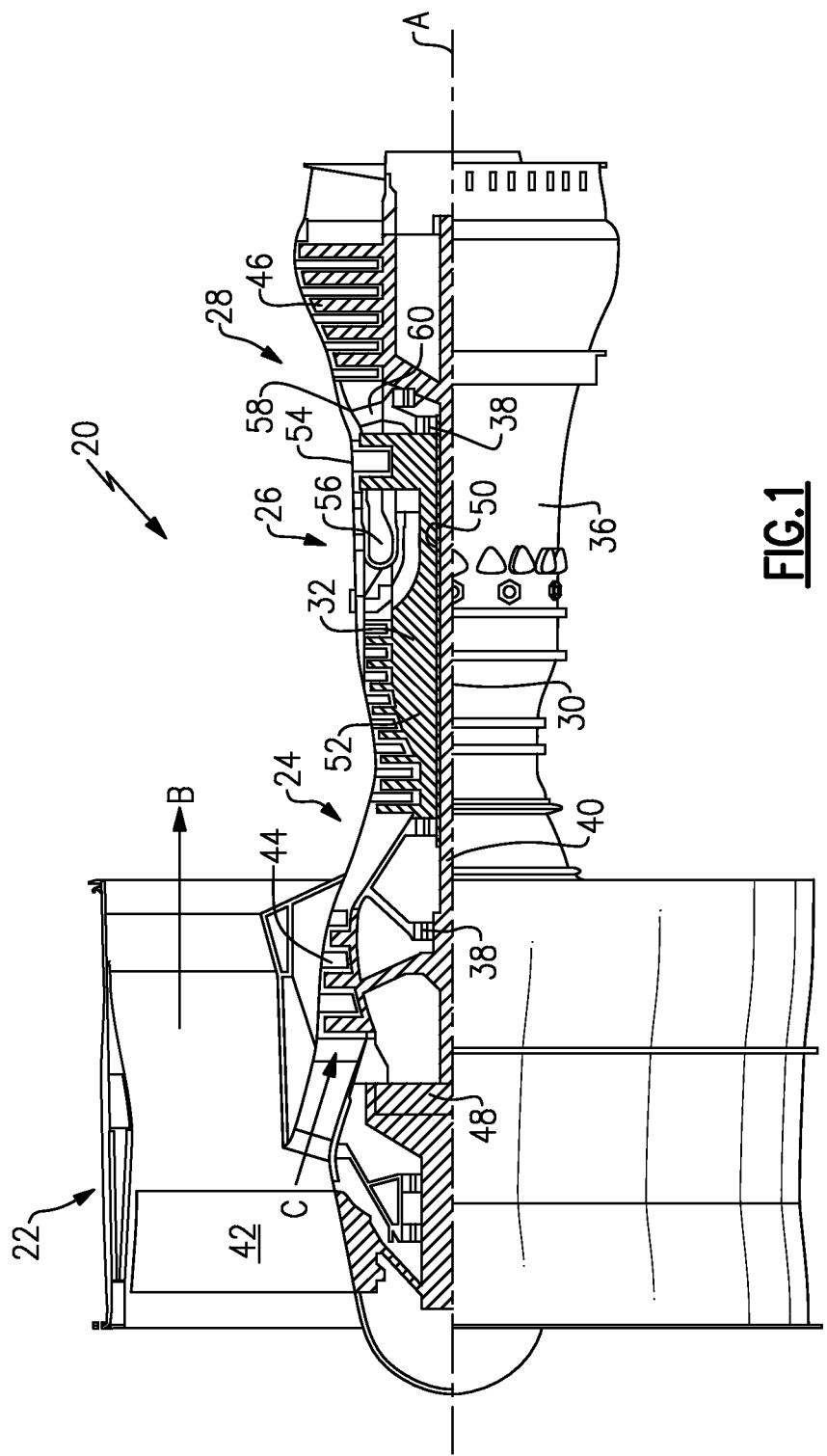
FIG. 1 illustrates a schematic view of an embodiment of a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to the combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a geared turbofan gas turbine engine, it should be understood that the concepts described herein are not limited to use with geared turbofans as the teachings may be applied to other types of traditional turbine engines. For example, the gas turbine engine 20 can have a three-spool architecture in which three spools concentrically rotate about a common axis and where a low spool enables a low pressure turbine to drive a fan, an intermediate spool that enables an intermediate pressure turbine to drive a first compressor of the compressor section, and a high spool that enables a high pressure turbine to drive a high pressure compressor of the compressor section.

The example gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor 44 to a low pressure (or first) turbine 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor 52 and a high pressure (or second) turbine 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The air in the core flow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core flow path C and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the air in the bypass flow path B due to the high bypass ratio. The fan section 22 of the gas turbine engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across a fan blade 62 alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

The example gas turbine engine includes the fan 42 that comprises in one non-limiting embodiment less than about 26 fan blades 62. In another non-limiting embodiment, the fan section 22 includes less than about 20 fan blades 62. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 62 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
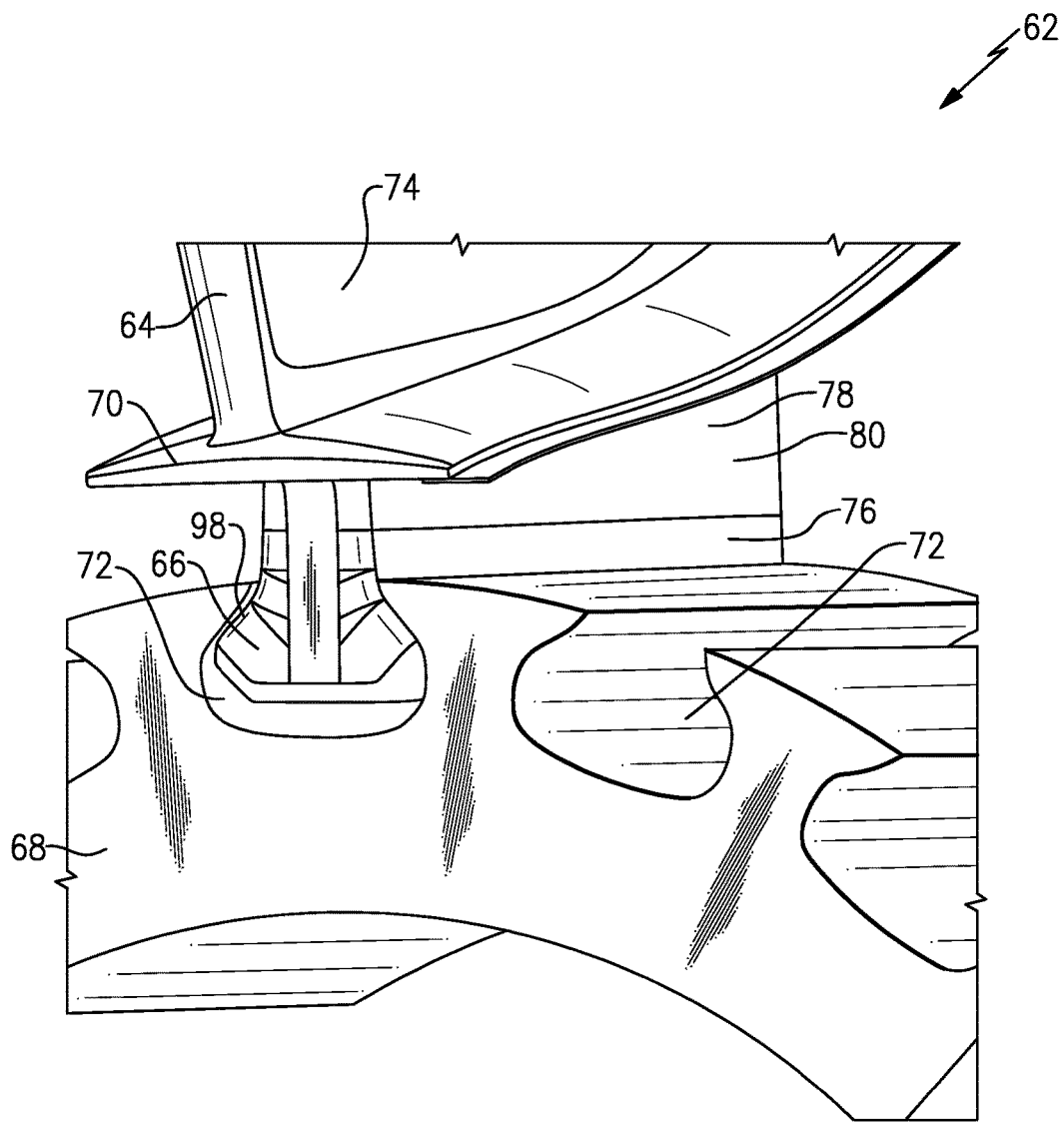
FIG. 2 illustrates a portion of a fan blade and a hub.

FIG. 2 illustrates a fan blade 62 of the fan 42. The fan blade 62 includes an airfoil 64, a root 66 that is received in a slot 72 of a hub 68, a platform 70 located radially inward of the airfoil 64, and a neck 78 located between the platform 70 and the root 66. The hub 68 includes a plurality of slots 72 that each receive the root 66 of one fan blade 62 such that the fan blades 62 extend radially around the engine central longitudinal axis A. In one embodiment, the fan blade 62 is made of an aluminum alloy.

The high stress locations are located in the airfoil 64. The airfoil 64 of the fan blade 62 is substantially hollow, reducing the weight of the fan blade 62 and making the fan blade 62 easier to contain in the event of a blade out event. As the fan blade 62 has a reduced weight, the blade attachment load is reduced. As a result, the weight of the fan section 22 is also reduced.

In one example, the airfoil 64 includes a plurality of internal channels (not shown), which reduce the weight of the fan blade 62. Aluminum foam can be located in each of the internal channels. A cover 74 is located over the internal channels to retain the aluminum foam in the internal channels. In one example, the cover 74 is bonded to the airfoil 64 by an adhesive. The platform 70 and the root 66 are substantially solid and do not include internal channels. As the root 66 is solid, nominal and concentrated stresses are reduced.

In an embodiment, the fan blade 62 is coated with a corrosion inhibiting primer coating 80 that acts as a seal to protect the fan blade 62 from exposure. The corrosion inhibiting primer coating 80 is applied over the entire surface of the fan blade 62 and provides a base surface for a wear pad 76 (discussed below). In one example, the corrosion inhibiting primer coating 80 is a chromated primer. In another example, the corrosion inhibiting primer coating 80 is 44GN036 sold by Deft, Inc.

In an embodiment, a wear pad 76 is located beneath the platform 70 and covers at least a portion of the neck 78 and at least a portion of the root 66 of the fan blade 62. The wear pad 76 protects the root 66 and prevents cracking and handling damage to the surface of the root 66, which improves crack resistance to prevent the initiation of cracks in the root 66.

In an embodiment, the wear pad 76 is cut into a desired shape and bonded or applied to a bearing surface 98 of the root 66 and at least portions of the neck 78 to provide additional protection from installation and wind milling. In one example, the wear pad 76 includes a plurality of spaced apart strips. The wear pad 76 can cover a portion or the entirety of the root 66 of the fan blade 62.

In one embodiment, the wear pad 76 is an integrally bonded woven composite laminate. In an additional embodiment, the wear pad 76 is made of polytetrafluoroethylene fibers and aramid polymer fibers. In another embodiment, the polytetrafluoroethylene fibers are Teflon® fibers, and the aramid polymer fibers are Nomex Fibers®. Teflon® and Nomex® are registered trademarks of E. I. du Pont de Nemours and Company of Wilmington, Del. In an embodiment, the wear pad 76 is bonded to the root 66 of the fan blade 62 with an adhesive. In an embodiment, the adhesive is epoxy.

In an embodiment, the fan blade 62 may be deep burnished to prevent any cracks that might form in the root 66 of the fan blade 62 from propagating. During the deep burnishing process, a ball is rolled across and applies pressure to the surface of the root 66, deforming the surface of the root 66. This creates a deep burnished compressive residual stress in the root 66. In one example, the burnishing depth of the root 66 is approximately 0.040 inch (0.2 cm). The burnished area can then be shot peened to cover the areas of the root 66 that cannot be effectively burnished. In one example, the peening depth of the remainder of the fan blade 62 is approximately 0.006 inch (0.015 cm). The burnished depth of the root 66 is greater than the peening depth of the remainder of the fan blade 62, further preventing cracking in the root 66.

The wear pad 76 and the deep burnishing together improve crack resistance and prevent the initiation of cracks in the root 66 of the fan blade 62. This is beneficial as a crack in the root 66 is more difficult to repair than a crack in the airfoil 64. Also, a failure in the root 66 liberates more mass than a fracture in an airfoil 64, which can be more damaging to the gas turbine engine 20.

Although a gas turbine engine 20 with geared architecture 48 is described, the fan blade 62 can be employed in a gas turbine engine without geared architecture.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A fan of a gas turbine engine comprising:
a hub including a plurality of slots; and
a plurality of fan blades, wherein each of the plurality of fan blades includes an airfoil, a platform that is located radially inward of the airfoil and extends laterally outward from opposing sides of the airfoil, a neck located between the platform and a root of each fan blade, the root of each of the plurality of fan blades is received in one of the plurality of slots of the hub, and a wear pad made of an integrally bonded woven composite laminate covers at least a portion of the root within the slot, the wear pad comprises a plurality of spaced apart strips that are located on at least one of the first side and the second side of the root, and multiple ones of the plurality of spaced apart strips are located on the first side of the root.

2. The fan as recited in claim 1 wherein the fan blade is made of aluminum alloy.

3. The fan as recited in claim 1 wherein the airfoil includes a plurality of channels, and a cover is located over the plurality of channels.

4. The fan as recited in claim 1 wherein the root is substantially solid.

5. The fan as recited in claim 1 wherein a corrosion inhibiting primer coating coats the fan blade.

6. The fan as recited in claim 1 wherein the wear pad is made of polytetrafluoroethylene fibers and aramid polymer fibers.

7. The fan as recited in claim 1 wherein the wear pad is bonded to the root of the fan blade with an adhesive.

8. The fan as recited in claim 1 wherein the root has a burnishing depth of 0.040 inch.

9. The fan blade as recited in claim 7 wherein the adhesive is epoxy.

10. The fan blade as recited in claim 1 wherein the plurality of spaced apart strips comprise three spaced apart strips.

11. The fan as recited in claim 5, wherein the corrosion inhibiting primer coating coats the entire fan blade.

12. The fan as recited in claim 5, wherein the plurality of spaced apart strips are adhered onto the corrosion inhibiting primer coating.

* * * * *